(12) United States Patent  
Nitta

(10) Patent No.: US 9,111,200 B2
(45) Date of Patent: Aug. 18, 2015

(54) IMAGE FORMING APPARATUS COMBINING STAMP IMAGE WITH ORIGINAL IMAGE

(71) Applicant: KYOCERA Document Solutions Inc., Osaka (JP)

(72) Inventor: Tsuyoshi Nitta, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/307,547

(22) Filed: Jun. 18, 2014

(65) Prior Publication Data

US 2014/0368845 A1    Dec. 18, 2014

(30) Foreign Application Priority Data

Jun. 18, 2013  (JP) .................................. 2013-128023

(51) Int. Cl.
H04N 1/405 (2006.01)
G06K 15/02 (2006.01)
H04N 1/32 (2006.01)

(52) U.S. Cl.
CPC ........ G06K 15/1852 (2013.01); G06K 15/1843 (2013.01); H04N 1/32144 (2013.01); H04N 1/32208 (2013.01); H04N 1/32309 (2013.01); H04N 2201/3271 (2013.01)

(58) Field of Classification Search
CPC .................... G09G 2300/0452; G09G 3/2003; G09G 2340/12; G06T 2207/20221; G06T 1/0028; G06T 2201/0051; H04N 2201/3271; H04N 1/32208; H04N 1/3876
USPC ............ 358/1.9, 2.1, 3.2, 515–518, 500, 504, 358/527, 468
See application file for complete search history.

(56) References Cited

U.S. PATENT DOCUMENTS

| 6,763,122 | B1  |   | 7/2004  | Rodriguez et al. |
| 6,912,069 | B1  |   | 6/2005  | Matsunoshita |
| 2002/0018233 | A1 |   | 2/2002  | Mori |
| 2008/0094651 | A1 |   | 4/2008  | Takahashi |
| 2008/0129746 | A1 |   | 6/2008  | Hanazato |
| 2010/0258018 | A1 | * | 10/2010 | Chou ........................ 101/333 |

FOREIGN PATENT DOCUMENTS

| CN | 101850677 A | * | 10/2010 |
| JP | 2008-108006 A |   | 5/2008 |

OTHER PUBLICATIONS

European Search Report and Opinion for App. No. EP 14172825.3, mailed Mar. 11, 2015.

* cited by examiner

Primary Examiner — Thomas D Lee
Assistant Examiner — Stephen M Brinich
(74) Attorney, Agent, or Firm — McDonnell Boehnen Hulbert & Berghoff LLP

(57) ABSTRACT

An image forming apparatus includes the following: a stamp shape data generation unit configured to generate stamp shape data indicating a shape of a stamp image, wherein the stamp image includes stamp color data indicating a color of the stamp image; a stamp combining unit configured to (i) generate planes of the stamp shape data corresponding to color components of the stamp color data, wherein a color density of each plane of the stamp shape data is equal to a color density of a corresponding color component of the stamp color data, and (ii) combine the planes of the stamp shape data with respective planes of image data to form a combined image; and an output execution unit configured to execute an output operation on the combined image.

20 Claims, 7 Drawing Sheets

IMAGE FORMING APPARATUS COMBINING STAMP IMAGE WITH ORIGINAL IMAGE

REFERENCE TO RELATED APPLICATIONS

This application is based upon and claims the benefit of priority from the corresponding Japanese Patent Application No. 2013-128023, filed in the Japan Patent Office on Jun. 18, 2013, the entire contents of which are incorporated herein by reference.

FIELD

The present disclosure relates to an image forming apparatus having a function of combining a stamp image with an original image.

BACKGROUND

In a typical image forming method for either printing or transmitting an output based on image data having planes corresponding to plurality of color components, 1-bit raster data is converted into respective pieces of 8-bit RGB raster data. Then, image data having of planes of color components of RGB is generated. Subsequently, the output based on the image data is either printed or transmitted.

In the typical image forming method, as illustrated in FIG. 7, when a stamp image is combined with image data 91 formed of planes 91a, 91b, and 91c of a respective plurality of color components, color-component-specific stamp images 92a, 92b, and 92c obtained by decomposing the stamp image into color components corresponding to the planes 91a, 91b, and 91c of the image data 91 are generated. Then, in the typical image forming method, the color-component-specific stamp images 92a, 92b, and 92c are combined with the corresponding planes 91a, 91b, and 91c.

In the typical image forming method, a number of color-component-specific stamp images equal to the number of planes of the image data are generated, which necessitates a large amount of memory capacity to store the color-component-specific stamp images.

SUMMARY

An image forming apparatus according to an embodiment of the present disclosure includes a stamp shape data generation unit, a stamp combining unit, and an output execution unit. The stamp shape data generation unit is configured to generate stamp shape data indicating a shape of a stamp image. The stamp image also includes stamp color data indicating a color of the stamp image. The stamp combining unit is configured to generate planes of the stamp shape data corresponding to color components of the stamp color data, such that a color density of each plane of the stamp shape data is equal to a color density of a corresponding color component of the stamp color data. The stamp combining unit is also configured to combine the planes of the stamp shape data with planes of image data to form a combined image. The output execution unit is configured to execute an output operation on the combined image.

An image forming method according to an embodiment of the present disclosure includes: (i) generating, via a stamp shape data generation unit, stamp shape data indicating a shape of a stamp image, where the stamp image includes stamp color data indicating a color of the stamp image; (ii) generating, via a stamp combining unit, planes of the stamp shape data corresponding to color components of the stamp color data, wherein a color density of each plane of the stamp shape data is equal to a color density of a corresponding color component of the stamp color data; (iii) combining, via the stamp combining unit, the planes of the stamp shape data with respective planes of image data to form a combined image; and (iv) executing, via an output execution unit, an output operation on the combined image.

A non-transitory computer-readable recording medium according to an embodiment of the present disclosure has instructions of an image forming program stored thereon that, when executed by a processor of a computer executes the image forming program. The image forming program includes at least a first program code, a second program code, a third program code, and a fourth program code. The first program code causes the computer to generate stamp shape data indicating a shape of a stamp image, where the stamp image includes stamp color data indicating a color of the stamp image. The second program code causes the computer to generate planes of the stamp shape data corresponding to color components of the stamp color data, wherein a color density of each plane of the stamp shape data is equal to a color density of a corresponding color component of the stamp color data. The third program code causes the computer to combine the planes of the stamp shape data with respective planes of image data to form a combined image. The third program code causes the computer to execute an output operation on the combined image.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Hereinafter, a description is made of an embodiment of the present disclosure with reference to the accompanying drawings.

First, a description is made of a configuration of a multifunction peripheral (MFP) serving as an image forming apparatus according to the embodiment.

Figure 1:
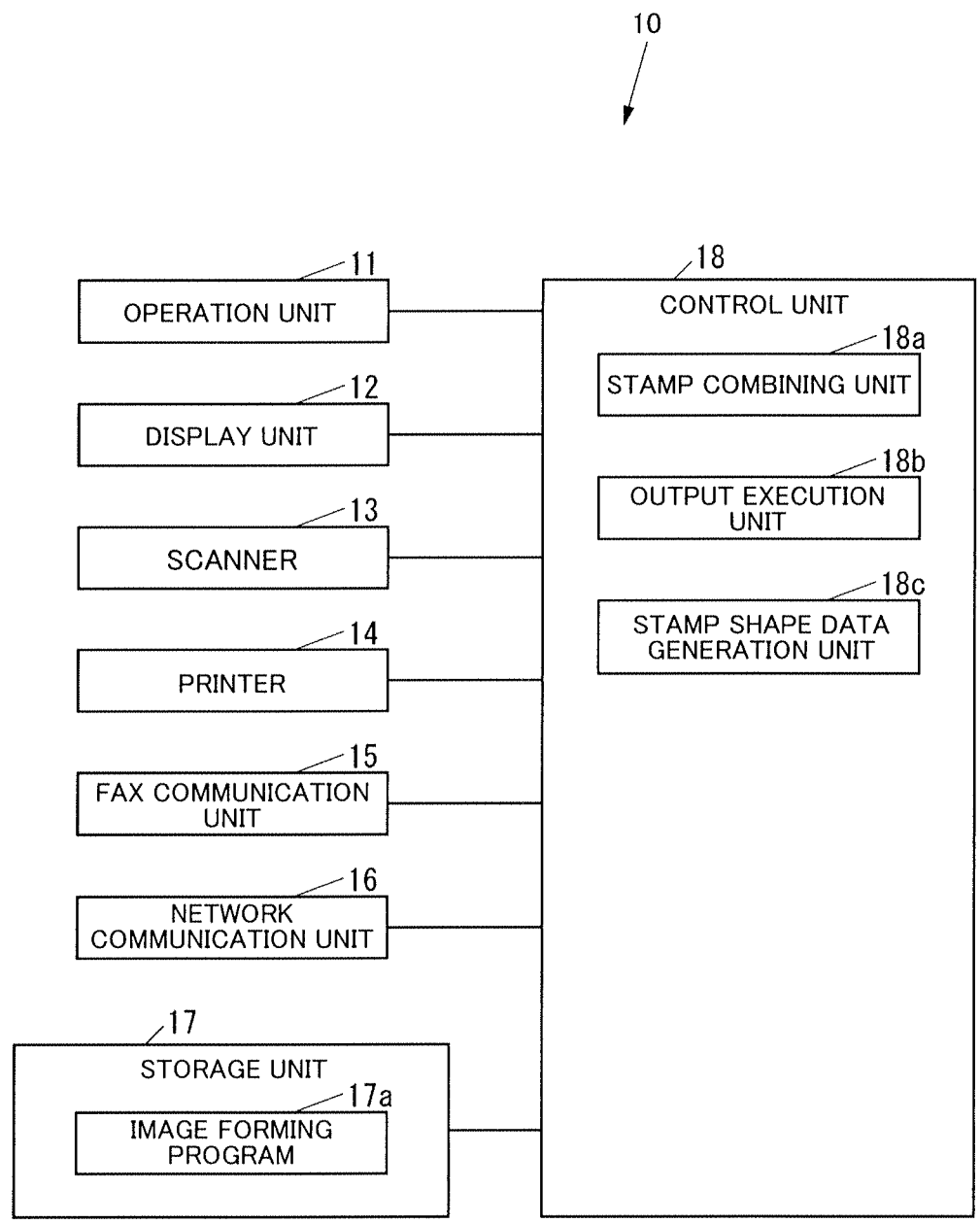
FIG. 1 illustrates a configuration of an MFP according to an embodiment of the present disclosure.

FIG. 1 illustrates a configuration of an MFP 10 according to the embodiment.

As illustrated in FIG. 1, the MFP 10 includes an operation unit 11, a display unit 12, a scanner 13, a printer 14, a FAX communication unit 15, a network communication unit 16, a storage unit 17, and a control unit 18. The operation unit 11 is a device including buttons or the like through which a user inputs various operations. The display unit 12 is a device such as a liquid crystal display (LCD) that displays various kinds of information. The scanner 13 is a device that reads an image from an original. The printer 14 is a device that executes printing on a recording medium such as paper. The FAX communication unit 15 is a device that performs FAX communications to/from an external facsimile apparatus (not shown) through a communication line such as a public telephone line. The network communication unit 16 is a device that performs communications to/from an external device through a network such as a local area network (LAN) and the Internet. The storage unit 17 is a nonvolatile storage device such as an electrically erasable programmable read only memory (EEPROM) and a hard disk drive (HDD) that stores various kinds of data. The control unit 18 is a processor that controls the entire MFP 10.

The operation unit 11 may include an input device that forms a touch panel together with the display unit 12.

The storage unit 17 stores an image forming program 17a used to form an image. The image forming program 17a may be installed in the MFP 10 at a manufacturing stage of the MFP 10, may be installed in the MFP 10 from a storage medium such as a universal serial bus (USB) memory or an SD memory card, or may be installed in the MFP 10 from the network.

The control unit 18 includes, for example, a central processing unit (CPU), a read only memory (ROM) for storing a program and different kinds of data, and a random access memory (RAM) used as a work area for the CPU. The CPU is configured to execute the program stored in the ROM or the storage unit 17.

The control unit 18 executes the image forming program 17a stored in the storage unit 17, to thereby function as a stamp combining unit 18a, an output execution unit 18b, and a stamp shape data generation unit 18c. The stamp combining unit 18a combines a stamp image with image data to thereby generate a combined image. The stamp image may include stamp shape data indicating a shape of the stamp image and a color of the stamp shape. One such example of a stamp is a character string printed in a particular color, although other such shapes may exist. Further, the stamp shape may be set via an input received from the operation unit 11, such that the stamp shape may be designated after an MFP has received image data of a document to print but before the MFP generates the output for printing or other transmission. The image data may be formed of a plurality of planes, where each plane corresponds to a single color component. One such example of the planes of image data are a cyan plane, a magenta plane, and a yellow plane, although other such planes may exist. The output execution unit 18b executes an output operation, such as printing the combined image or transmitting the combined image over a communication network, among other operations. The stamp shape data generation unit 18c generates stamp shape data indicating the shape of the stamp image.

It should be noted that a stamp image comprises stamp shape data and stamp color data. Both the stamp shape data and stamp color data may be input via the operation unit 11. As a result, a stamp shape, such as text having a particular font, and a stamp color may be separately specified.

Next, a description is made of an operation of the MFP 10.

Figure 2:
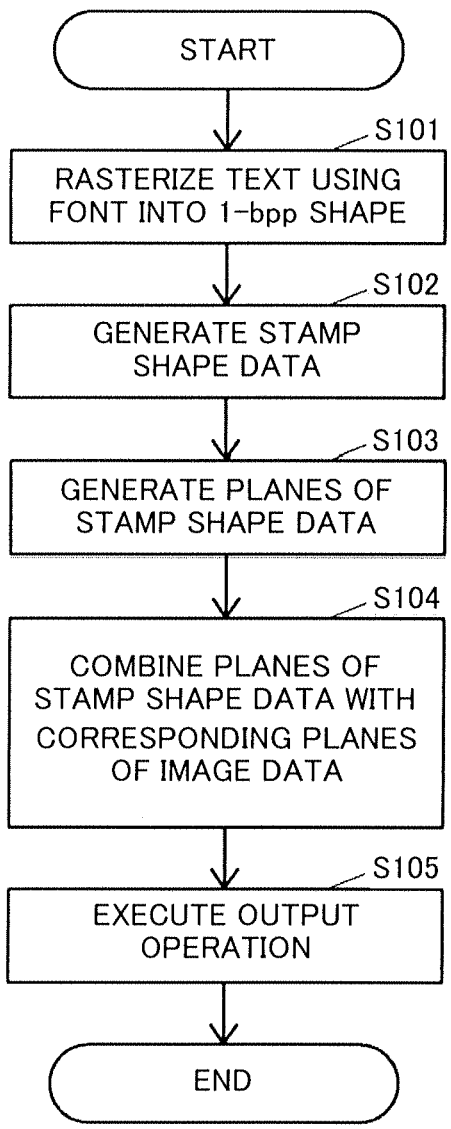
FIG. 2 illustrates an example operation of the MFP illustrated in FIG. 1 generating a combined image that includes image data and a stamp image and executing an operation using the combined image.

The control unit 18 of the MFP 10 executes an operation illustrated in FIG. 2 when an instruction for the printing involving the combining of the stamp image is input through the operation unit 11.

Figure 3:
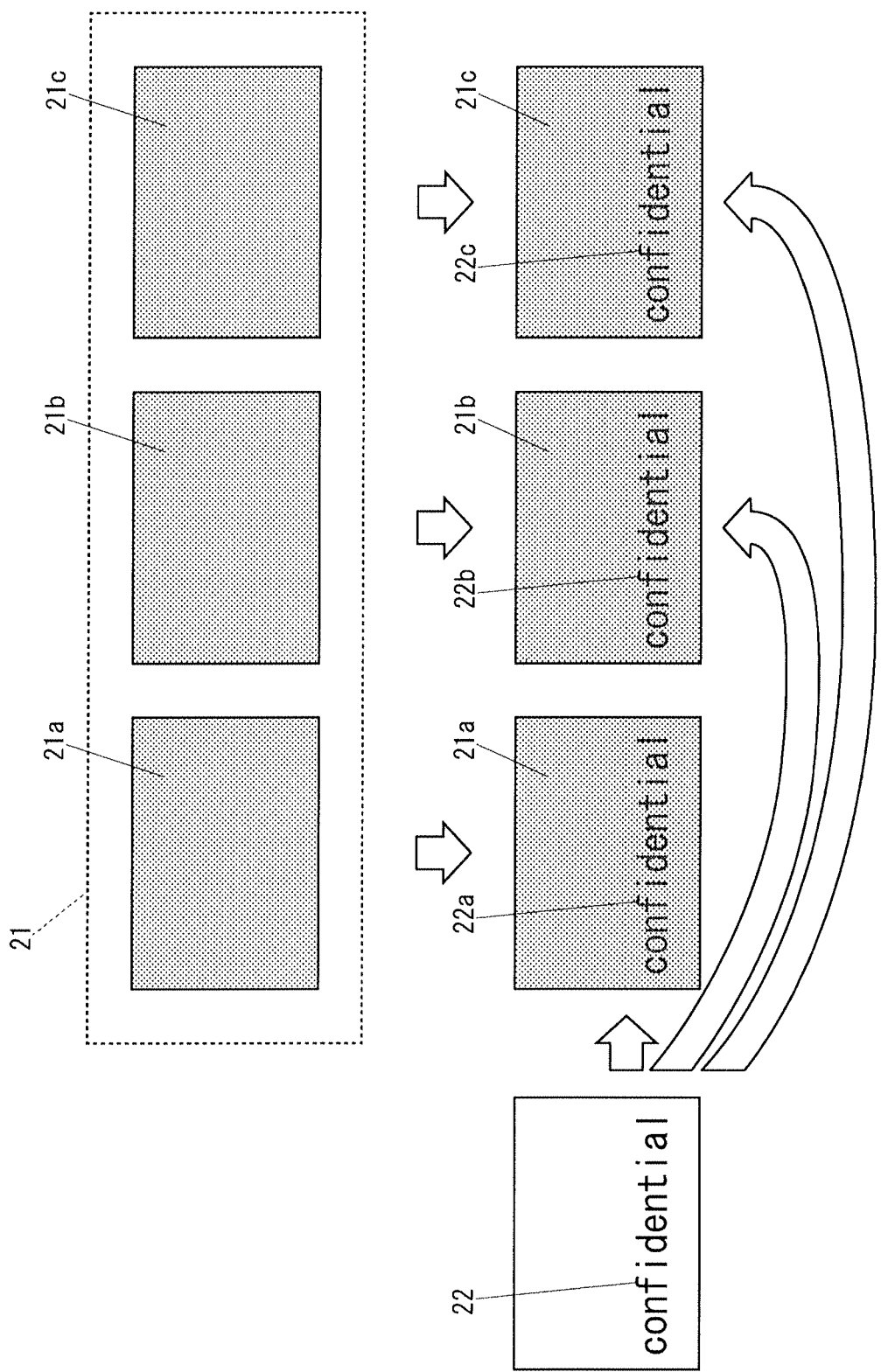
FIG. 3 illustrates an example in which the MFP illustrated in FIG. 1 combines planes of the stamp image with planes of image data formed of three colors of CMY.

FIG. 2 illustrates an example operation of the MFP 10 generating a combined image that includes image data and a stamp image and executing an operation using the combined image. FIG. 3 illustrates an example in which the MFP 10 combines image data 21, where the image data includes cyan, magenta, and yellow (CMY) planes, with the stamp image.

As illustrated in FIG. 2 and FIG. 3, the stamp shape data generation unit 18c of the control unit 18 generates 1 bit per pixel (bpp) raster data by rasterizing a character string using a font, the shape of the text serving as a base of the stamp image (Step S101).

Subsequently, the stamp shape data generation unit 18c converts the 1-bpp raster data generated in Step S101 into 8-bpp grayscale raster data, to thereby generate the stamp shape data 22 indicating the shape of the stamp image (Step S102). In the embodiment, the grayscale corresponding to the plane is set to 8 bpp, and the stamp shape data generation unit 18c converts the 1-bpp raster data into 8-bpp raster data. Here, the stamp shape data generation unit 18c executes the processing of Step S102 by using dedicated hardware that converts the 1-bpp raster data into the 8-bpp raster data. Further, the stamp shape data generation unit 18c generates the stamp shape data 22 as monochrome data without generating color data in the processing of Step S102. In other words, the stamp shape data generation unit 18c generates only the stamp shape data 22 on one monochrome plane in the processing of Step S102.

After the processing of Step S102, the stamp combining unit 18a generates planes of the stamp shape data 22 that combined form the stamp color data of the stamp image (Step S103). In other words, the color densities of each plane of the stamp shape data 22 are adjusted to match the color densities specified by the stamp color data. Note that a "plane" may herein refer to a single color component of an image, such that combining all of an images "planes" form the color of the image. Then, the stamp combining unit 18a combines the planes of stamp shape data 22 with corresponding planes of the image data 21 (Step S104). The stamp combining unit 18a may execute the processing of Step S103 by using dedicated hardware. Note that, color densities of the respective color components of the stamp image may be designated in the instruction for the printing involving the combining of the stamp image through the operation unit 11 along with the stamp image to be combined.

In FIG. 3, a cyan plane of the stamp shape data 22a of the stamp image is combined with the cyan plane of the image data 21a. A magenta plane of the stamp shape data 22b of the stamp image is combined with the magenta plane of the image data 21b. A yellow plane of the stamp shape data 22c of the stamp image is combined with the yellow plane of the image data 21c.

For example, when the color densities of cyan, magenta, and yellow planes of the stamp image are 255, 128, and 100 in 8 bpp, respectively, the stamp combining unit 18a combines the cyan plane of the stamp shape data 22 with the cyan plane of the image data 21a after adjusting the stamp shape data 22 to have the color density of 255. Then, the stamp combining unit 18a combines the magenta plane of the stamp shape data 22 with the magenta plane of the image data 21b after adjusting the stamp shape data 22 to have the color density of 128. Then the stamp combining unit 18a combines the yellow plane of the stamp shape data 22 with the yellow plane of the image data 21c after adjusting the stamp shape data 22 to have the color density of 100. In other words, a cyan plane of the stamp image of the color density of 255 is combined with the cyan plane of the image data 21a, a magenta plane of the stamp image of the color density of 128 is combined with the magenta plane of the image data 21b, and a yellow plane of the stamp image of the color density of 100 is combined with the yellow plane of the image data 21c.

After the processing of Step S103, the output execution unit 18b may execute a print output performed by the printer 14 based on the image data combined with the stamp image in Step S103 (Step S104), and the operation illustrated in FIG. 2 is brought to an end.

Note that, the example illustrated in FIG. 3 relates to a case where none of the color densities of the planes of the stamp image—such as the cyan plane, the magenta plane, and the yellow plane—is zero. Instead or in addition, when the color density of a given plane of the stamp image is zero, the stamp combining unit 18a may omit the processing for combining the stamp shape data 22 with the given plane of the color component in Step S103.

Figure 4:
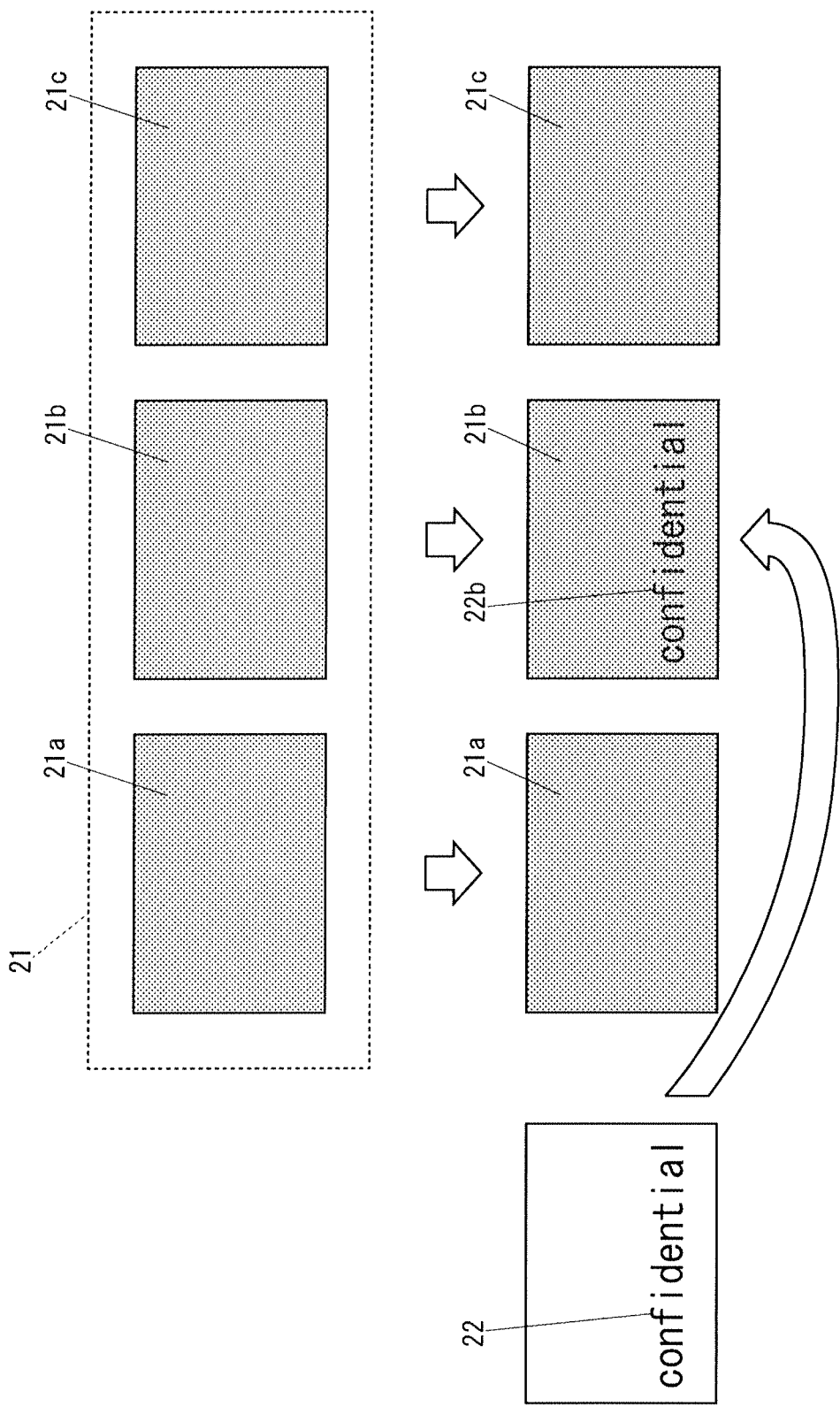
FIG. 4 illustrates an example in which the MFP illustrated in FIG. 1 combines the stamp image caused to be transmissive with the image data formed of the three colors of CMY when only a density of magenta among color components of the stamp image is not zero.

The example illustrated in FIG. 4 relates to a case where only the color density of the magenta plane of the stamp image is not zero. For example, when the color densities of the cyan plane, the magenta plane, and the yellow plane of the stamp image are 0, 255, and 0 in 8 bpp, as illustrated in FIG. 4, the stamp combining unit 18a combines the stamp shape data 22 generated in Step S102 with the magenta plane of the image data 21b after adjusting the magenta plane of the stamp shape data 22 to have the density of 255. Then, the stamp combining unit 18a inhibits the stamp shape data 22 generated in Step S102 from being combined with the cyan plane of the image data 21a and the yellow plane of the image data 21c. In other words, the stamp combining unit 18a omits the processing for combining the stamp shape data 22 with the cyan plane of the image data 21a and the processing for combining the stamp shape data 22 with the yellow plane of the image data 21c in Step S103.

Figure 5:
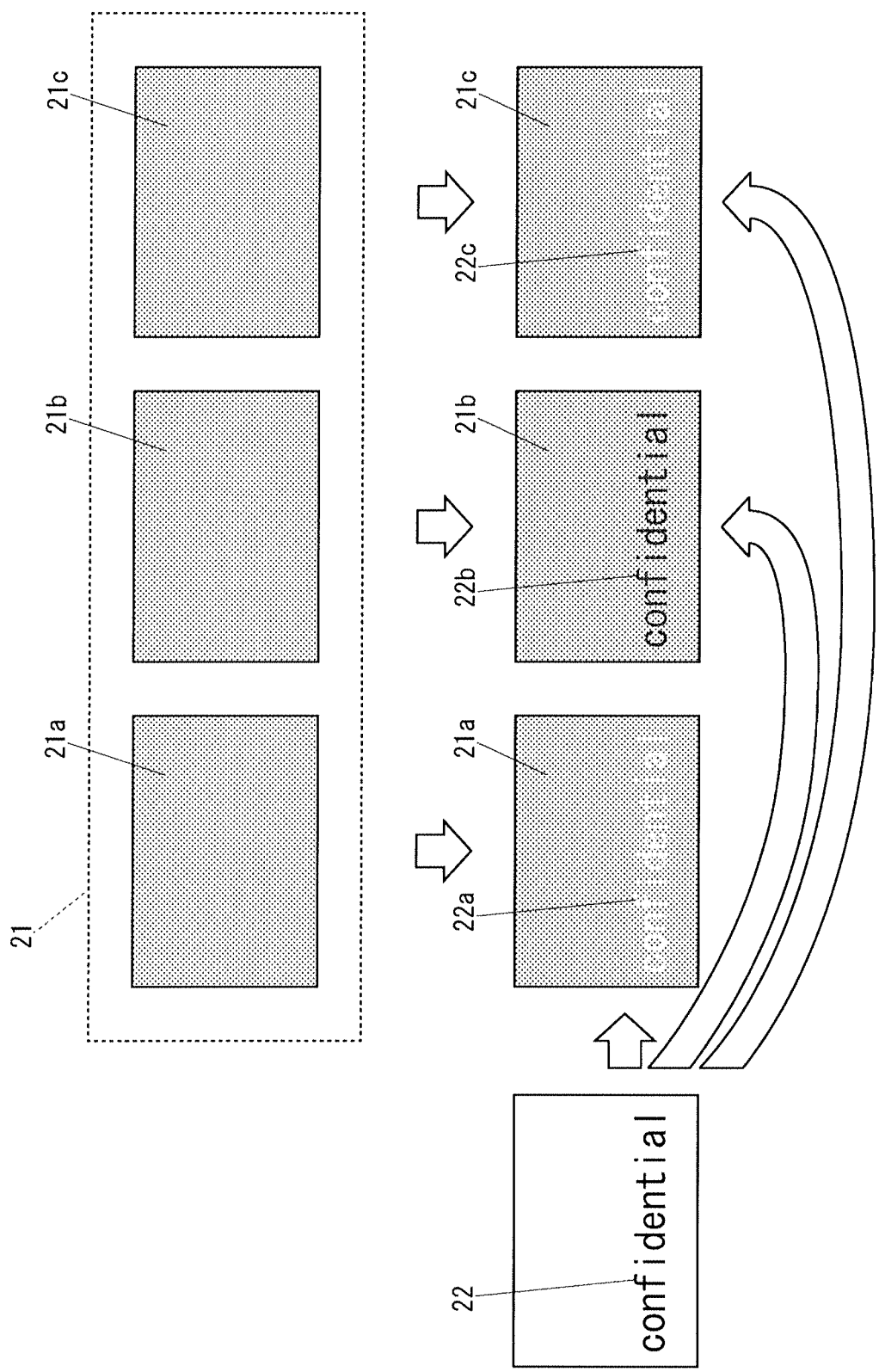
FIG. 5 illustrates an example in which the MFP illustrated in FIG. 1 combines the stamp image caused to overwrite the image data with the image data formed of the three colors of CMY when only a density of magenta among color components of the stamp image is not zero.
Figure 6:
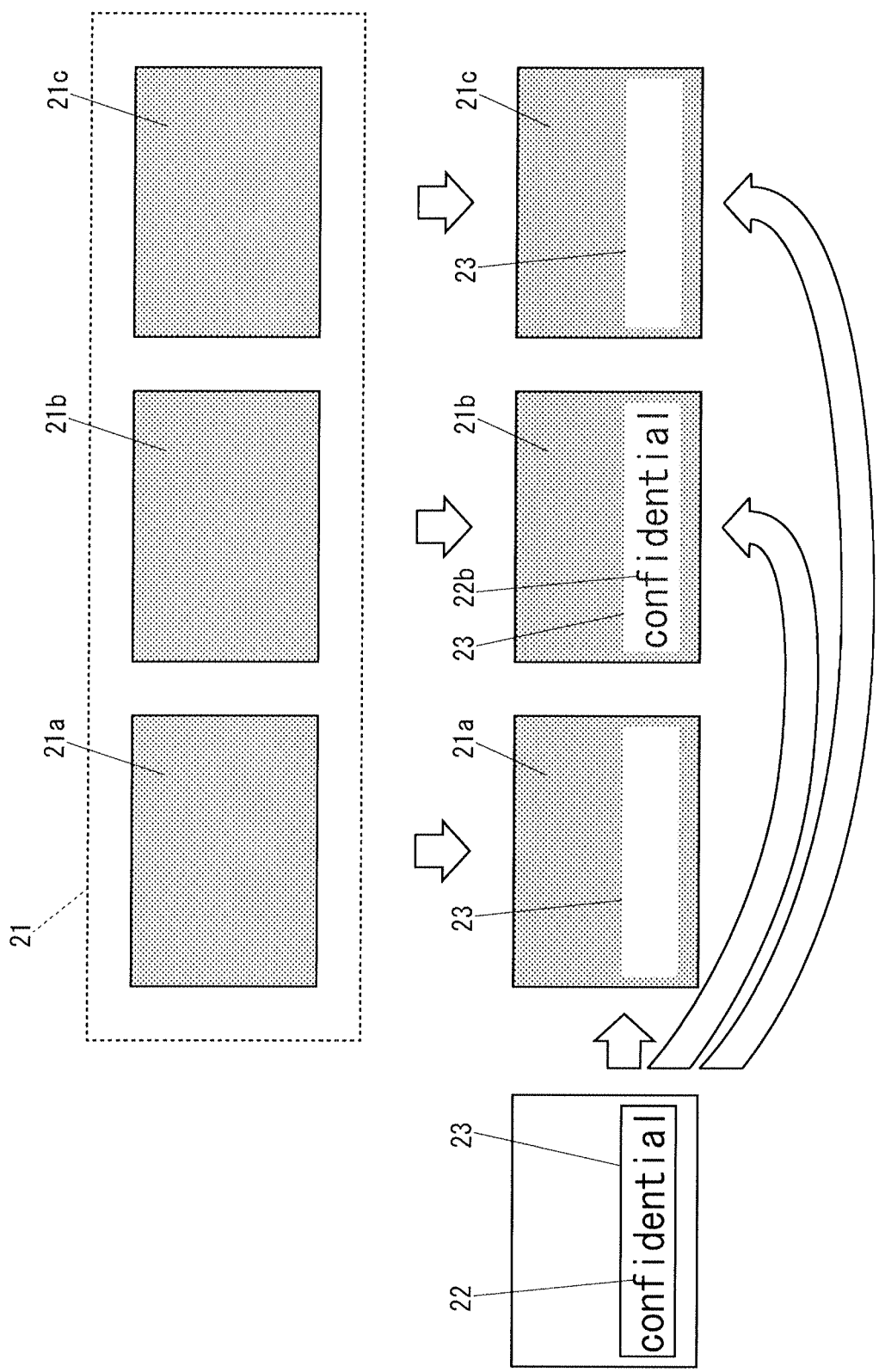
FIG. 6 illustrates an example in which the MFP illustrated in FIG. 1 combines the stamp image surrounded by a hollow rectangle frame with the image data formed of the three colors of CMY when only a density of magenta among color components of the stamp image is not zero.
Figure 7:
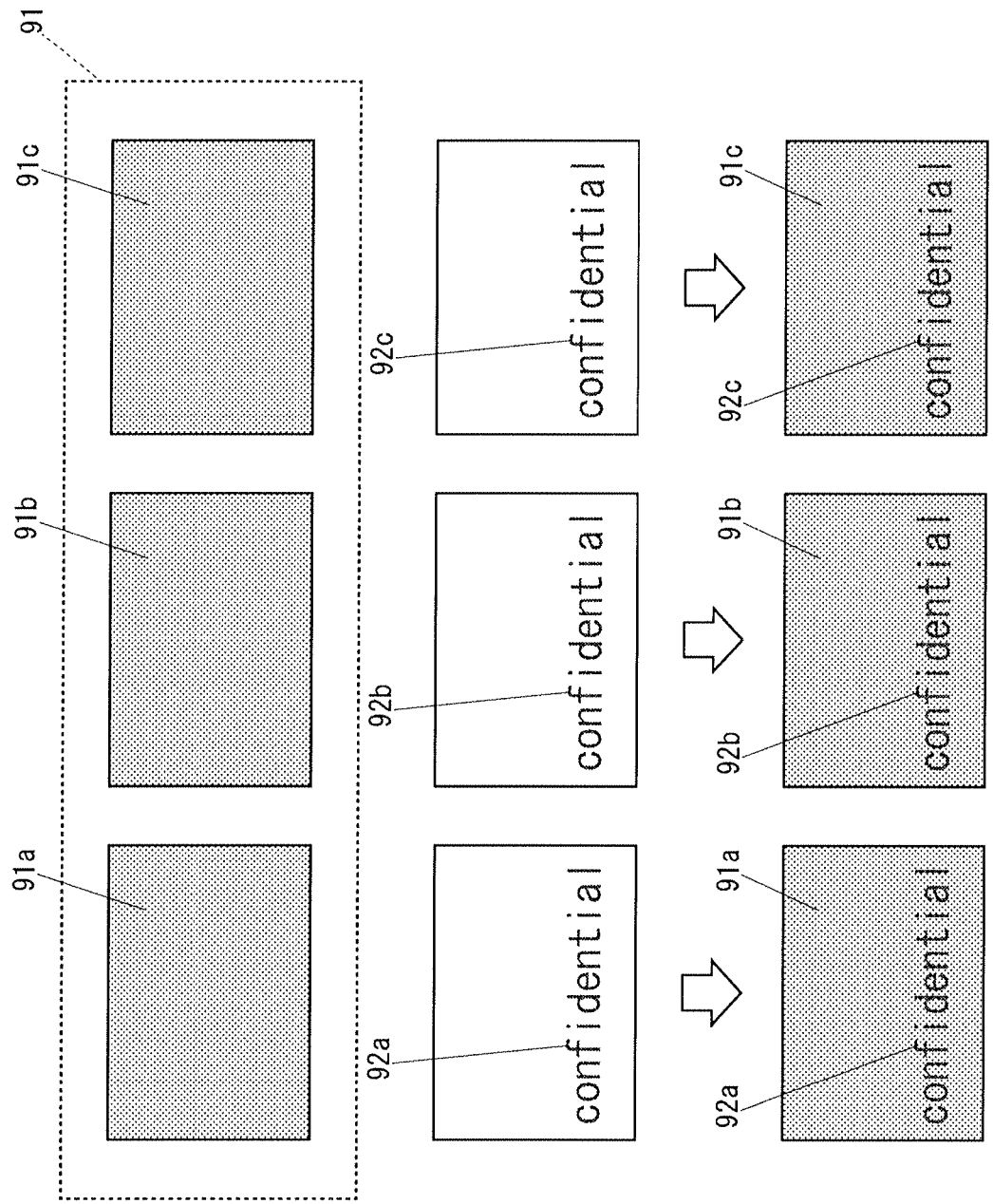
FIG. 7 illustrates an example in which a typical image forming apparatus combines a stamp image with an image data.

In one example, a stamp image may be configured to overwrite image data 21, which is illustrated in FIG. 5. In another example, a stamp image is surrounded by a hollow rectangle frame, and is combined with the image data 21, which is illustrated in FIG. 6. In either of these examples, when a particular plane of the stamp image has a density of zero, the stamp combining unit 18a still performs the processing of combining the particular plane of the stamp image with its corresponding plane of the image data. In other words, the stamp combining unit may not omit the processing of combining a particular plane of a stamp image with its corresponding plane of image data, even if the density of the particular plane of the stamp image is zero, under certain circumstances, such as overwriting the image data or when the stamp image is surrounded by a hollow rectangle frame, for example.

As described above, when combining the stamp image with the image data 21 formed of the planes 21a, 21b, and 21c of a respective plurality of color components, the MFP 10 generates the stamp shape data 22 indicating the shape of the stamp image (Step S102). Then, the MFP 10 generates planes of stamp shape data 22, each plane having a density corresponding to a color component of the stamp color data. After that, the MFP 10 combines the planes of the stamp shape data 22 with each of the corresponding planes of image data 21a, 21b, and 21c (Step S103).

Therefore it suffices that one stamp shape data 22 is stored in the RAM instead of a number of color-component-specific stamp images equal to the number of the planes 21a, 21b, and 21c of the image data 21. Accordingly, the MFP 10 can suppress the capacity of the RAM necessary to combine the stamp image with the image data 21 formed of the planes 21a, 21b, and 21c of the respective plurality of color components.

In particular, if the MFP 10 is configured to store a number of color-component-specific stamp images equal to the number of planes of the image data in the RAM, as the size of the font serving as the base of the stamp image increases, a data size of all the plurality of color-component-specific stamp images increases. Accordingly, as the size of the font serving as the base of the stamp image increases, the MFP 10 is more advantageous in suppressing the capacity of the RAM necessary to combine the stamp image.

Further, if the MFP 10 is configured to store a number of color-component-specific stamp images equal to the number of planes of the image data in the RAM, the number of planes increases when the stamp image is a color image than when the stamp image is a monochrome image. Therefore, a total data size of the plurality of color-component-specific stamp images becomes larger. Accordingly, the MFP 10 can suppress the capacity of the RAM necessary to combine the stamp image when the stamp image is a color image.

Further, the MFP 10 omits unnecessary processing for combining the stamp shape data 22 with the planes 21a, 21b, and 21c, and can therefore alleviate a processing load in combining the stamp image with the image data 21 formed of the planes 21a, 21b, and 21c of the respective plurality of color components.

Further, the output performed by the output execution unit 18b may be a print output performed by the printer 14 in the embodiment or a transmissive output. For example, the output performed by the output execution unit 18b may be an output such as a FAX transmission performed by the FAX communication unit 15 or a transmission performed by the network communication unit 16.

Further, in the embodiment, the stamp shape data generation unit 18c uses the dedicated hardware that converts the 1-bpp raster data into the 8-bpp raster data, but may use software instead.

Further, in the embodiment, the stamp combining unit 18a may use dedicated hardware to execute the processing of Step S103, or the stamp combining unit 18a may use software instead to execute the processing.

Further, the image forming apparatus according to the present disclosure is the MFP in the embodiment, but may be an image forming apparatus other than the MFP, such as a dedicated printer, a dedicated copier, or a dedicated FAX machine.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   a stamp shape data generation unit configured to generate stamp shape data indicating a shape of a stamp image, wherein the stamp image includes stamp color data indicating a color of the stamp image;
   a stamp combining unit configured to (i) generate planes of the stamp shape data corresponding to color components of the stamp color data, wherein a color density of each plane of the stamp shape data is equal to a color density of a corresponding color component of the stamp color data, and (ii) combine the planes of the stamp shape data with image data to form a combined image, wherein the image data has planes each corresponding to a color component, and wherein the stamp combining unit is configured to combine the planes of the stamp shape data with corresponding planes of the image data to form the combined image; and
   an output execution unit configured to execute an output operation on the combined image.

2. The image forming apparatus according to claim 1, further comprising:
   a network communication unit connected to a communication network, wherein the network communication unit is configured to transmit the combined image to a computing device connected to the communication network.

3. The image forming apparatus according to claim 1, further comprising:
   a printer configured to print the combined image onto a recording medium.

4. The image forming apparatus according to claim 1, wherein, based on a density of a plane of the stamp shape data being zero, the stamp combining unit is configured to prevent processing for combining the plane of the stamp shape data with a corresponding plane of the image data.

5. The image forming apparatus according to claim 1, wherein the stamp shape data generation unit is further configured to:
   rasterize a character string using a font to generate 1-bpp (bit per pixel) raster data; and
   convert the 1-bpp raster data into 8-bpp raster data, wherein the 8-bpp raster data is associated with a shape having a grayscale color between black and white.

6. The image forming apparatus according to claim 1, further comprising:
   an operation unit configured to receive an input character string and an input color, wherein the input character string indicates the shape of the stamp image and the input color indicates the color of the stamp image.

7. The image forming apparatus according to claim 1, wherein the image data is indicative of a scanned original document.

8. An image forming method, comprising:
   generating, via a stamp shape data generation unit, stamp shape data indicating a shape of a stamp image, wherein the stamp image includes stamp color data indicating a color of the stamp image;
   generating, via a stamp combining unit, planes of the stamp shape data corresponding to color components of the stamp color data, wherein a color density of each plane of the stamp shape data is equal to a color density of a corresponding color component of the stamp color data;
   combining, via the stamp combining unit, the planes of the stamp shape data with image data to form a combined image, wherein the image data has planes each corresponding to a color component, and wherein the planes of the stamp shape data are combined with corresponding planes of the image data to form the combined image; and
   executing, via an output execution unit, an output operation on the combined image.

9. The image forming method according to claim 8, further comprising:
   transmitting, via a network communication unit connected to a communication network, the combined image to a computing device connected to the communication network.

10. The image forming method according to claim 8, further comprising:
    printing, via a printer, the combined image onto a recording medium.

11. The image forming method according to claim 8, further comprising:
    based on a density of a plane of the stamp shape data being zero, preventing processing, via the stamp combining unit, for combining the plane of the stamp shape data with a corresponding plane of the image data.

12. The image forming method according to claim 8, further comprising:
    rasterizing, via the stamp shape data generation unit, a character string using a font to generate 1-bpp (bit per pixel) raster data; and
    converting, via the stamp shape data generation unit, the 1-bpp raster data into 8-bpp raster data, wherein the 8-bpp raster data is associated with a shape having a grayscale color between black and white.

13. The image forming method according to claim 8, further comprising:
    receiving, via an operation unit, an input character string and an input color, wherein the input character string indicates the shape of the stamp image and the input color indicates the color of the stamp image.

14. A non-transitory computer-readable recording medium having instructions of an image forming program stored thereon that, when executed by a processor of a computer, cause the computer to execute the image forming program, the image forming program comprising:
    a first program code for causing the computer to generate stamp shape data indicating a shape of a stamp image, wherein the stamp image includes stamp color data indicating a color of the stamp image;
    a second program code for causing the computer to generate planes of the stamp shape data corresponding to color components of the stamp color data, wherein a color density of each plane of the stamp shape data is equal to a color density of a corresponding color component of the stamp color data;
    a third program code for causing the computer to combine the planes of the stamp shape data with image data to form a combined image, wherein the image data has planes each corresponding to a color component, and wherein the third program code causes the computer to combine the planes of the stamp shape data with corresponding planes of the image data to form the combined image; and a fourth program code for causing the computer to execute an output operation on the combined image.

15. The non-transitory computer-readable recording medium according to claim 14, wherein the image forming program further comprises:

a fifth program code for causing the computer to transmit the combined image to a computing device connected to a communication network.

16. The non-transitory computer-readable recording medium according to claim 14, wherein the image forming program further comprises:

a sixth program code for causing the computer to print the combined image onto a recording medium.

17. The non-transitory computer-readable recording medium according to claim 14, wherein the image forming program further comprises:

a seventh program code for causing the computer to, based on a density of a plane of the stamp shape data being zero, prevent processing for combining the plane of the stamp shape data with a corresponding plane of the image data.

18. The non-transitory computer-readable recording medium according to claim 14, wherein the image forming program further comprises:

an eighth program code for causing the computer to rasterize a character string using a font to generate 1-bpp (bit per pixel) raster data; and a ninth program code for causing the computer to convert the 1 bpp raster data into 8-bpp raster data, wherein the 8-bpp raster data is associated with a shape having a grayscale color between black and white.

19. The non-transitory computer-readable recording medium of claim 14, wherein the image forming program further comprises:

a tenth program code for causing a computer to receive an input character string and an input color, wherein the input character string indicates the shape of the stamp image and the input color indicates the color of the stamp image.

20. The non-transitory computer-readable recording medium of claim 14, wherein the image data is indicative of a scanned original document.

* * * * *